Figure 1:
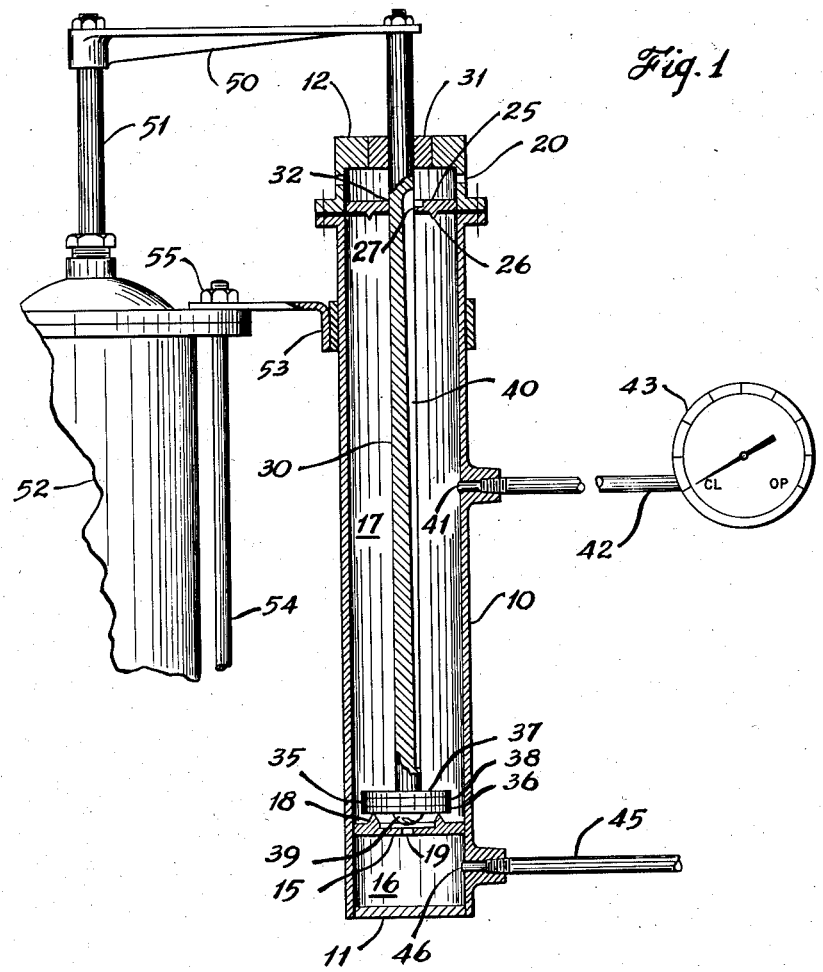

March 11, 1958     S. L. ADELSON     2,826,165

POSITION INDICATOR

Filed Oct. 31, 1955

AREA "A" - 19
AREA "a" - 27, 40

United States Patent Office 2,826,165
Patented Mar. 11, 1958

2,826,165

POSITION INDICATOR

Samuel L. Adelson, Tucson, Ariz., assignor to Infilco Incorporated, Tucson, Ariz., a corporation of Delaware Application October 31, 1955, Serial No. 543,711

13 Claims. (Cl. 116—125)

This invention relates to a device for indicating the position of a reciprocable member and particularly to a device of this general type which is pneumatically operated and permits remote indication. The position of the member which is indicated by the new device may itself be the subject of interest, or it may be indicative of the position of another device. The new position indicator can be used, for example, to remotely indicate the position of a float rod defining the liquid level in a basin; or for indicating the position of the tail rod of a hydraulic or pneumatic cylinder to ascertain the degree of opening of a valve operated by the hydraulic or pneumatic cylinder.

It is an object of this invention to provide a position indicator for a reciprocable member which is simple and economical in construction and operation.

Another object is to provide a device indicating the position of a reciprocable member which is pneumatically operated and permits remote indication.

Another object is to provide a pneumatically operated position indicator for a reciprocable member which consumes air only when the reciprocable member is in a position between its end positions.

Other objects will become apparent upon consideration of the specification and the claims which follow.

Because the invention is particularly suitable for indicating the closing and opening positions of a hydraulically or pneumatically operated valve, it will be described for purposes of exemplification and illustration in connection with the movements of the tail rod of a hydraulically operated valve. It is, however, to be understood that the invention is not limited to this specific application.

Figure 2:
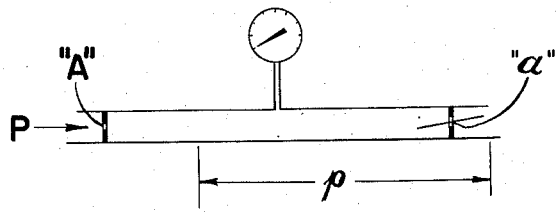

The invention will be more readily understood by reference to the drawing wherein:

Figure 1 is a vertical cross-sectional view, partly in elevation, of an embodiment of the invention; and Figure 2 is a diagrammatic illustration of the principle underlying the invention.

The position indicator comprises a cylindrical casing 10, which is closed at its one end by a closure plate 11 and at its other end by a cover 12 which is flanged to the cylindrical side wall of the casing 10 and may be affixed thereto by any suitable means, not shown.

A partition 15 extends across the casing 10 and separates the lower end portion 16 from the main portion or chamber 17 of the casing. The partition 15 is shaped to form a valve seat 18 facing the main portion 17 and has a centrally located orifice of constant area 19. The cover 12 is provided with vent openings 20. A plate or partition 25 extends across the cover 12 and separates the space within the cover from the main portion or chamber 17 of casing 10. The plate 25 is shaped to form a valve seat 26 facing the valve seat 18. The plate 25 has a narrowed portion 27, as shown.

A rod 30 extends into the casing 10 through a bearing 31 in the top of the cover 12 and is slideable with very small clearance in a central opening 32 in the plate 25. The rod 30 may carry two suitably spaced valve members with seating faces on opposite sides thereof; preferably, however, the end of the rod 30 within the casing 10 carries a valve member 35, comprising a pair of disks 36 and 37 of rubber or other suitable material rigidly connected as by a spider or, as shown, affixed to opposite sides of a metal plate 38. The valve member 35 is fixed to the end of the rod 30 by means of a screw 39.

The rod 30 has a groove 40, shown as of constant width but increasing in depth from the end of the rod to which the valve member is fastened and extending for a sufficient length that a portion of the groove will register with the narrowed portion 27 of plate 25 in all positions of the rod.

The cylindrical wall of casing 10 is provided with a pressure port 41 intermediate the partition 15 and plate 25 for connection through suitable piping 42 to a pressure gauge 43, which may be at any desired location, close to, or remote from, the casing 10. Air or other gas under pressure from a suitable source of gas under pressure arrives through a pipe 45 and enters the lower end portion 16 of the casing through an inlet port 46.

The end of rod 30 outside the casing 10 is fixed to one end of a bracket 50, the other end of the bracket being fixed to the tail rod 51 of the hydraulic cylinder 52 of a hydraulically operated valve, not shown. The casing 10 may be supported in alignment with the hydraulic cylinder in any suitable manner, one convenient way being to support the casing from the hydraulic cylinder 52 by means of a bracket 53 attached to the cylinder by means of a tie rod 54 and nut 55.

The parts of the position indicator must be proportioned to one another in such manner that the indicator rod 30, in following the reciprocating movement of the tail rod 51 from its position where the valve is completely closed to the position where the valve is completely open, moves from a position where the seat 18 becomes uncovered to a position where the seat 26 becomes covered.

In operation air under constant pressure enters the lower end portion 16 of the casing 10 through pipe 45, passes through constant orifice 19 and, provided the seat 18 is uncovered, into the main part 17 of the casing, then through that portion of groove 40 which is in register with the narrowed portion 27 of plate 25, and through the vent openings 20 in the cover 12 to atmosphere. The pressure gauge 43 will then indicate a pressure between the supply pressure and atmosphere, depending upon the area of the groove 40 which is in register with the narrowed portion of the plate 25, the narrowed portion 27 together with the groove 40 forming in effect an orifice of variable area. The greater the upward movement of tail rod 51 and, therefore, the greater the degree of opening of the valve, the smaller the area of groove 40 which registers with the portion 27 of plate 25 and the greater the pressure applied to the gauge 43.

If a fluid passes through a conduit (Figure 2) from a pressure P to atmosphere through two orifices of areas A and a in series, the pressure p between the orifices may be expressed as:

$$p = \frac{A^2 P}{A^2 + a^2}$$

From this it can be seen that as $a$ decreases, $p$ increases, and vice versa.

Therefore, any increase or decrease in the combined area of groove 40 and portion 27 of plate 25 (representing $a$), due to movement of the rod 30, causes a corresponding change in the pressure applied to the gauge 43 (corresponding to $p$), and the reading of the gauge is thus an indication of the position of the valve.

When the valve is fully closed and the tail rod 51 and indicator rod 30 are in their lowermost positions, the disk 36 of valve member 35 engages the seat 18 and prevents entry of air from line 45 into the main part 17 of the indicator casing; the gauge, therefore, will read zero. At fully open valve position, with the tail rod 51 and indicator rod 30 in their uppermost positions, the disk 37 of valve member 35 contacts seat 26, preventing escape of air to the atmosphere, and the reading on the gauge then equals the supply pressure. In the fully closed and fully open positions of the valve, therefore, no air is consumed, air escaping to atmosphere only when the valve is in an intermediate position.

It will be obvious that the variable orifice can be used for admitting fluid under pressure to the main portion of the casing and the constant orifice for discharging fluid from the main portion. In such case, the pressure $p$ will increase as the area of the variable orifice $a$ increases and vice versa. The gauge will then be calibrated to indicate that increasing pressure corresponds to decreasing valve opening and decreasing pressure to increasing valve opening. Alternatively, the groove 40 could be made of decreasing depth from the end of the rod carrying valve member 35, in which case the pressure $p$ will increase when the area of the variable orifice $a$ decreases.

It will be seen that the new position indicator provides very simple means to indicate the position of a reciprocable member.

It will also be obvious to those skilled in the art that the invention is not limited to indicating, but that a record of the position of the reciprocable member can be obtained by connecting any of the many well-known pneumatic recording means to the line 42. Some modifications of the construction can be made without departing from the spirit and scope of the invention. Thus the groove 40 is made of uniform width only for convenience in manufacture, but this is not essential for the operation of the device and the groove may increase in width or depth or both. Further, instead of providing a groove, other ways of shaping the rod so that it varies the fluid escape area, such as, for example, increasingly flattening the rod from its round form at the lower end, could be resorted to. The plate 25 need not be narrowed, as shown at 27, as the groove 40 alone can serve as a variable area outlet for the gas. It is, therefore, to be understood that I do not wish to limit myself to the specific details of construction shown and described for purposes of illustration and exemplification.

I claim:

1. A device for obtaining a fluid pressure which is a function of the position of a reciprocable member comprising a chamber having two orifices, one of said orifices admitting fluid from a source of fluid under constant pressure to said chamber and the other orifice discharging fluid from said chamber, means operated by said reciprocable member for varying the area of one of said orifices in accordance with the position of said reciprocable member, and a pressure port intermediate said orifices.

2. A device for obtaining a fluid pressure which is a function of the position of a reciprocable member comprising a pressure chamber having an orifice for admission of fluid under constant pressure and a second orifice for discharging said fluid from said chamber, means operated by said reciprocacable member for varying the area of said second orifice in accordance with the position of said reciprocable member, a pressure port intermediate said orifices for connection to a pressure indicating means, and valve means positionable by said means for varying the area of said second orifice, said valve means closing one of said orifices in one end position of said reciprocable member, and closing the other orifice in the other end position of said reciprocable member.

3. A device for indicating the position of a reciprocable member comprising a pressure chamber having an orifice of constant area and having a wall provided with an opening and with a cut-out portion adjacent said opening, a rod reciprocable in said opening, said rod being shaped to form with said cut-out portion of said wall an orifice of variable area, the area of said variable orifice varying according to the position of said rod, one of said constant and variable area orifices being an inlet for fluid from a source of fluid under constant pressure to said chamber and the other orifice being a fluid outlet from said chamber, means operated by said reciprocable member for positioning said reciprocable rod, a pressure port leading from said chamber intermediate said orifices, and a pressure indicating means connected to said port.

4. A device for indicating the position of a reciprocable member comprising a pressure chamber having a side wall and two end walls, said end walls being shaped to form valve seats facing each other, an orifice in one of said end walls for admitting gas under pressure to said pressure chamber, a reciprocable rod extending through said other end wall, valve means affixed to said rod and adapted to engage one of said valve seats in one end position of said rod and the other valve seat in the other end position of said rod, said rod having a groove increasing in area from the end of said rod within said chamber, said other end wall having a narrowed portion registering with said groove, a pressure port in said side wall, and a pressure indicating means connected to said pressure port, the end of said rod outside said chamber being adapted for connection to the reciprocable member whose position is to be indicated.

5. The device of claim 4, wherein said groove is of constant width and increasing in depth from the end of said rod carrying said valve means.

6. A position indicator for a reciprocable member comprising a casing, a partition separating one end portion of said casing from its main portion, said partition forming a first valve seat facing said main portion and having an orifice within the area surrounded by said valve seat, a second partition separating the other end portion of said casing from its main portion, said second partition forming a second valve seat facing said main portion and having a central opening, said second partition being narrowed adjacent said central opening, a reciprocable rod extending into said casing through said opening with small clearance, valve means affixed to said rod and adapted to engage said first valve seat when said rod is in one end position and the second valve seat when the rod is in its other end position, a groove in said rod increasing in area from the end of the rod within said casing, said groove registering with said narrowed portion of said second partition and forming therewith an orifice of variable area, inlet means for gas under pressure to said one end portion, a vent from said other end portion, a port in the main portion of said casing, and pressure indicating means connected to said port, the end of said rod outside said casing being adapted for connection to and reciprocation with the reciprocable member.

7. A position indicator for a reciprocable member comprising a closed casing, a first and a second partition separating opposed end portions of said casing from its main portion, inlet means for gas under pressure to the end portion separated by said first partition, vent means connecting the other end portion to atmosphere, a port in said main portion, a pressure gauge connected to said port, said partitions forming valve seats facing each other, said first partition having an orifice within the area surrounded by its valve seat and said second partition having a central opening, a reciprocable rod extending into said casing and slideable with small clearance in said opening in said second partition, said rod carrying at one end a valve member adapted to cover the seat formed by said first partition when the rod is in one end position, and to cover the seat formed by said second partition when the rod is in its other end position, said rod having a groove, the depth of said groove increasing from the end of said rod carrying said valve member, said second partition having a narrowed portion registering with said groove and forming therewith an orifice of variable area, and means for connecting the end of said rod outside said casing to the reciprocable member whose position is to be indicated.

8. The device of claim 7, wherein said valve member has opposed faces of resilient material.

9. A device for obtaining a fluid pressure which is a function of the position of a member comprising a pressure chamber having an orifice of constant area for admission of fluid under constant pressure and having a wall, a reciprocable rod extending through said wall into said chamber, said rod having a groove providing an outlet for discharging said fluid from said chamber, the area of said groove varying from one end of said rod toward the other, means operated by said member for positioning said rod, said chamber having a pressure port intermediate said orifice and said wall for connection to a point of application of said fluid pressure which is a function of the position of said member.

10. A device for obtaining a fluid pressure which is a function of the position of a member, comprising a chamber having two orifices, one of said orifices admitting fluid from a source of fluid under constant pressure to said chamber and the other orifice discharging fluid from said chamber, a pressure port intermediate said orifices, and means operated by movement of said member for varying the effective area of one of said orifices in accordance with variations in the position of said member.

11. A device for obtaining a fluid pressure which is a function of the position of a member, comprising a pressure chamber having an orifice for admission of fluid under constant pressure, a second orifice for discharging said fluid from said chamber, means operated by movement of said member for varying the effective area of said second orifice in accordance with variations in the position of said member, and a pressure port intermediate said orifices adapted for connection to a point of application of said fluid pressure which is a function of the position of said member.

12. A device for obtaining a fluid pressure which is a function of the position of a member comprising a pressure chamber having two orifices, one of said orifices admitting fluid from a source of fluid under constant pressure to said chamber and the other orifice discharging fluid from said chamber, means operated by movement of said member for varying the area of one of said orifices, valve means positionable by said means for varying the area of one of said orifices and closing one of said orifices in one end position of said member and closing the other of said orifices in the other end position of said member, and a pressure port intermediate said orifices and adapted for connection to a point of application of said fluid pressure which is a function of the position of said member.

13. A device for obtaining a fluid pressure which is a function of the position of a member comprising a pressure chamber, an element having an orifice of constant area, a second element having an orifice whose area varies in size from one end of said orifice to its other, one of said orifices discharging fluid under constant pressure into said chamber, and the other orifice discharging fluid from said chamber, means operated by movement of said member for determining the area of the orifice of said second element through which fluid is discharged, and a pressure port intermediate said elements.

References Cited in the file of this patent

UNITED STATES PATENTS

| | | |
|---|---|---|
| 1,619,937 | Huff | Mar. 8, 1927 |
| 1,720,389 | Binks | July 9, 1929 |
| 2,452,956 | Robins | Nov. 2, 1948 |
| 2,516,825 | Hejduk | July 25, 1950 |
| 2,725,212 | Jensen | Nov. 29, 1955 |